United States Patent [19]

Bramblett

[11] Patent Number: 5,146,976
[45] Date of Patent: Sep. 15, 1992

[54] ELECTRO-SLAG CASTING APPARATUS AND METHOD

[75] Inventor: John D. Bramblett, Dapto, Australia

[73] Assignee: The Broken Hill Proprietary Company Limited, Melbourne, Australia

[21] Appl. No.: 585,097

[22] PCT Filed: Mar. 30, 1989

[86] PCT No.: PCT/AU89/00136
§ 371 Date: Nov. 19, 1990
§ 102(e) Date: Nov. 19, 1990

[87] PCT Pub. No.: WO89/09291
PCT Pub. Date: Oct. 5, 1989

[30] Foreign Application Priority Data

Mar. 31, 1988 [AU] Australia .................. PI7569

[51] Int. Cl.$^5$ .................. B22D 23/10; B22D 27/02
[52] U.S. Cl. .................. 164/470; 164/509
[58] Field of Search .................. 164/497, 515, 470, 509

[56] References Cited

U.S. PATENT DOCUMENTS

| 3,834,443 | 9/1974 | Ujiie . | |
|---|---|---|---|
| 3,835,914 | 9/1974 | Ujiie | 164/509 X |
| 3,835,916 | 9/1974 | Ujiie | 164/509 |
| 4,280,550 | 7/1981 | Roberts | 164/515 |

FOREIGN PATENT DOCUMENTS

| 466334 | 4/1974 | Australia . | |
|---|---|---|---|
| 456454 | 9/1974 | Australia . | |
| 535772 | 4/1984 | Australia . | |
| 52-57020 | 5/1977 | Japan | 164/509 |
| 473427 | 6/1980 | U.S.S.R. | 164/509 |
| 2089699A | 6/1982 | United Kingdom | 164/515 |

Primary Examiner—J. Reed Batten, Jr.
Attorney, Agent, or Firm—Nikaido, Marmelstein, Murray & Oram

[57] ABSTRACT

The casting apparatus includes an electro-slag mould (7) which includes a bath adapted to hold a pool of molten flux and an underlying pool of refined liquid metal and an exit passage extending downwardly from the bath. The casting apparatus further includes electrode carrier (FIG. 2) adapted to feed a consumable electrode (51) of raw metal into the bath and a power supply to pass a heating current from the electrode through the flux pool to melt the electrode. The apparatus further includes a product transporter (FIG. 1) to draw a cast product downwardly from the mould, and a drive (9,11) to effect concerted rotary oscillation about the axis of the product, of the mould, and of the product transporter.

13 Claims, 9 Drawing Sheets

FIG.13

ELECTRO-SLAG CASTING APPARATUS AND METHOD

FIELD OF THE INVENTION

The present invention is related to the electro-slag refining process.

Briefly stated, the electro-slag refining process comprises providing a pool of electrically conductive molten slag in a metallic bath into which is fed a consumable electrode through which a current is fed into the slag pool to keep it molten. Metal melts from the electrode and falls in drops to the bottom of the bath during which process it is refined, with dross and impurities floating to the top of the pool. Usually all of the refined metal is derived from the electrode, but this is not essential and in other embodiments bar stock or the like may be fed into the slag in addition to the electrode.

If the bottom of the bath incorporates a cooled exit passage (the combination of an electro-slag bath and structure defining such a passage is called a "mould" hereinafter) from which a solidified plug may be extracted, the rates of electrode feed and plug extraction and the amperage may be adjusted and controlled to provide for the continuous casting of an ingot of the refined metal. The emerging ingot has a cross-sectional shape determined by that of the passage.

Similarly, if a hot core body substantially but not completely plugging the passage is moved through the mould at an appropriate velocity, refined metal entering the passage with the core body may fuse to it to become a surface layer thereon conforming to the passage shape.

The invention utilises both versions of the process described above either to make an ingot, suitable for use, for example, as a mill roll, from raw stock metal, or to apply a surface layer to a core body, which may be a worn mill roll to be thus reclaimed.

DESCRIPTION OF THE PRIOR ART

Australian patent specification 466334 (The British Iron and Steel Research Association) discloses both the production of a tubular ingot and the surface cladding of a roll shaped arbor by the electro-slag process. In the latter instance the relative movement of the arbor and the mould is effected by raising the mould about the arbor. There is no suggestion of any movement of the consumable electrodes relative to the mould except for their raising and lowering to maintain current flow through the flux. The arbor may be rotated about its own axis as cladding proceeds. A coil encircles the mould which is said to be activated "to promote stirring of the flux and molten metal pool" in the mould but there are no further details or paramaters of that coil. Because in electro-slag apparatus the heating current tends to take the shortest path from the electrode(s) to the mould it is thought, with electrode(s) disposed as shown in this prior art specification, that the degree of stirring that would be required to produce substantially uniform temperatures throughout the bath, would be impracticable to obtain.

Australian patent specification 535772 (Nippon Steel Corporation) also discloses the cladding of a cylindrical core body by the electro-slag process. This specification also discloses apparatus in which the mould rises about the core body. The core body is rotated about its own axis, allegedly to obtain "a uniform circumferential temperature-distribution in the slag". The mould is preferably rotated in synchronism with the core body "to reduce friction between the mould and the workpiece".

Thus both of the prior art specifications (which are the most pertinent known to the applicant) teach the desirability of uniform temperature distribution in the slag and both disclose apparatus in which the mould is raised to create the relative movement of mould and the emergent product.

In practice it is necessary to set or adjust several parameters simultaneously to obtain a fully formed ingot or a fully formed and correctly bonded surface layer. Those parameters include the speed of relative movement between the mould and the product, the magnitude of the electric current, the temperature of the core body, the feed-in speed of the electrode(s), the level of the liquid metalflux interface in the mould and the depth of the flux layer, all of which are interdependent. When it is remembered that very large current flows from the electrode(s) to the bath have to be maintained, that a copious supply of mould cooling water has also to be maintained, and that make-up flux has to be added to the bath from time to time from a separate tundish it is not surprising that the prior known apparatus and their control systems for moving and servicing the mould are undesirably complex.

In practice a further major deficiency of the prior art flows from the creation of hot spots and other variations in the temperature distribution in the flux, the metal pool, the core body, if present, and the emergent product, due to fluctuating low resistance paths in the flux resulting from and contributing to irregular melt off of the electrode(s). Such temperature variations result in distortions in the shape of the finished product rendering it unsuitable for use as a mill roll. In experiments leading to the present invention it was found that rotating the product alone or in concert with the mould, even when the nominal spacing between the electrode and the mould walls is the same at all points, is an inadequate response to this problem.

SUMMARY OF THE INVENTION

Objects of the present invention are to overcome or ameliorate the above indicated deficiencies of the prior art.

The first, namely the simplification of both the apparatus and its operation, is achieved by providing apparatus wherein the mould remains at a fixed height and location and the solidified product is drawn downwardly therefrom.

The invention overcomes the second mentioned problem by oscillating the product, the core body if present, and the mould in unison, thereby evening out changes in the spatial relationship (current path) between the mould and the electrode(s) and effectively stirring both the flux and the pool of molten metal due to the inertial surges and changes in the direction of viscous shearing forces induced therein as the direction of rotation of the oscillating components reverses.

According to one aspect, the invention consists in an electro-slag continuous casting apparatus of the kind comprising an electro-slag mould, itself comprising a bath adapted to hold a pool of molten flux and an underlying pool of refined liquid metal and a downwardly extending exit passage, electrode carrier means adapted to feed a consumable electrode of raw metal into said bath, and power supply means to pass a heating current from the electrode through the flux pool to melt the electrode, characterised by the provision of:

(a) product transporter means to draw a cast product downwardly from the mould, and (b) drive means to effect concerted rotary oscillation about the axis of the product, of the mould, transporter means and product, relative to the electrode.

According to another aspect, the invention consists in a method of making a cast product of the kind comprising the steps of charging an electro-slag mould with molten flux, continuously feeding a consumable electrode of raw metal into the flux, passing an electric current from the electrode through the flux to maintain it molten and progressively melt off the electrode, and withdrawing a solidified product through the bottom of the mould, characterised by the step of rotationally oscillating the mould and product in unison about the axis of the product, relative to the electrode.

In preferred embodiments of the invention the mould is supported by a load carrying turn-table and the product transporter means depend rigidly from the underside of the turn-table. Furthermore those means are able not only to draw a product downwardly from the mould as it is cast but also to raise a core body to be clad through the mould.

BRIEF DESCRIPTION OF THE DRAWINGS

By way of example, an embodiment of the above described invention is described in more detail hereinafter with reference to the accompanying drawings.

DESCRIPTION OF THE PREFERRED EMBODIMENT

The illustrated apparatus is adapted for use in the cladding of a core body, for example a large mill roll, and is described accordingly hereinafter, however it will be appreciated that by suitable choice of mould size, electrode, and adapters it may be used without other modification for the continuous casting of new products.

The illustrated apparatus comprises an electro-slag mould 7. In itself the mould 7 is conventional and is therefore not described in detail herein. Briefly stated, it comprises a hollow-walled, water-cooled, cylindrical structure made of copper and defining a bore having an upper, larger diameter portion, a lower, smaller diameter portion and a short, intermediate, tapered portion. In use the flux pool is retained in the upper portion into which the electrode extends and the lower portion is plugged by the solidified cast product. Molten metal from the electrode collects in the tapered portion, enters the lower portion together with the core body and solidifies as a surface layer on the product in the lower portion of the mould as the product is progressively withdrawn. In other embodiments of the invention composite moulds having a heat resistant graphite or ceramic upper portion made of copper or any other heat conductive material and a water cooled lower portion may be used. In either instance the mould is preferably a multi-segment water cooled, copper mould with the individual segments grouped as two units by support means able to swing the unitised groups apart or together to open or close the mould. Alternatively, a one piece mould may be used. An additional water cooled mandrel can be added to the centre of the mould to facilitate production of hollow product.

Figure 1:
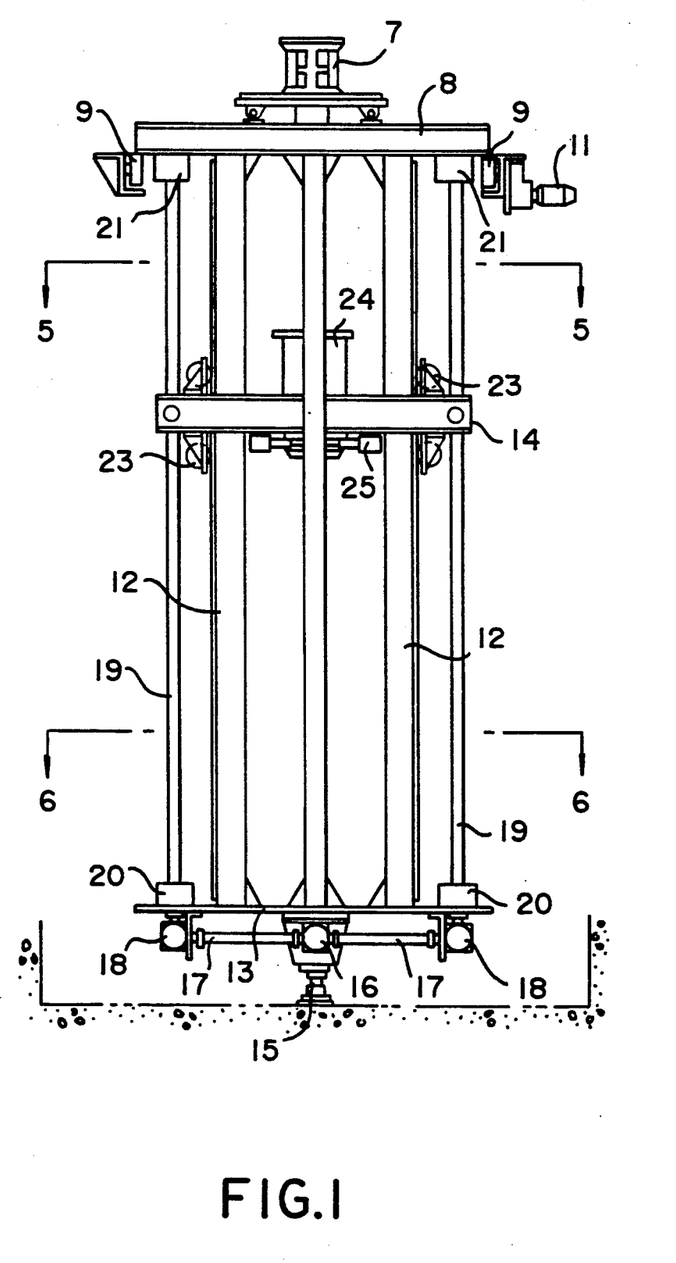
FIG. 1 is a front elevation of a mould and the below floor components of an electro-slag casting apparatus according to the invention.

The mould 7 is supported on a robust, fabricated turntable 8 furnished with a bevelled peripheral edge margin on its underside constituting a track making contact with three conical supporting rollers 9. The rollers 9 are in turn supported by structural steelwork 10. Two of the rollers 9 are idlers but the third is driven by a geared motor 11. Guide rollers (not shown) adjacent the support rollers 9, mounted for rotation about fixed upright axes, bear against the rim of the turn-table 8 to ensure it remains centered as it is rotated by the driven roller 9. In accordance with the invention the control arrangements for the reversible motor 11 are such that the turn-table 8 is oscillated to and fro. In the case of a large scale apparatus such as that now being described, the turn-table may be oscillated at a speed of say 1 revolution per minute, or thereabouts, through an angle of say 360° or a little greater.

Product transporter means, adapted, in this instance, not only to lower the finished product but also to raise a core body, such as a large rolling mill roll standing on end, depend rigidly from the turn-table 8. Those transporter means comprise four columnar hangers 12, a cruciform base 13 and an elevator carriage 14.

The base 13 has a central stub shaft projecting into a floor mounted floating bearing 15 (or vice versa) preventing lateral movement of the transporter means but allowing the weight of the turn-table 8, transporter means, mould 7 and core body to be taken by the rollers 9.

The base 13 carries a reversible geared motor 16 which, by way of transmission shafts 17 and gear boxes 18, effects concerted rotation of two jack screws 19 extending from respective bearing assemblies 20 on the base 13 to corresponding bearing assemblies 21 on the turn-table 8.

The jack screws 19 extend through low friction nuts 22 mounted on the carriage 14 in a manner permitting them to align with the screws 19 but not to rotate therewith. Each nut 22 may be of the kind comprising a housing with antifriction rollers engaging the thread of the screw. Such nuts are conventional and need no further description herein. Thus rotation of the jack screws 19 causes the carriage 14 to rise or fall, depending on the direction of rotation of the motor 16.

That movement of the carriage 14 is guided by bogies on the carriage with wheels 23 riding on two of the hangers 12 as rails. The wheels 23 of the bogies are supplemented by side rollers (not shown) so that lateral movement of the carriage 14 in any direction is prohibited. The carriage 14 is furnished with a product holder 24 detachably secured to the carriage 14 by hydraulically powered latch bolts 25.

Figure 9:
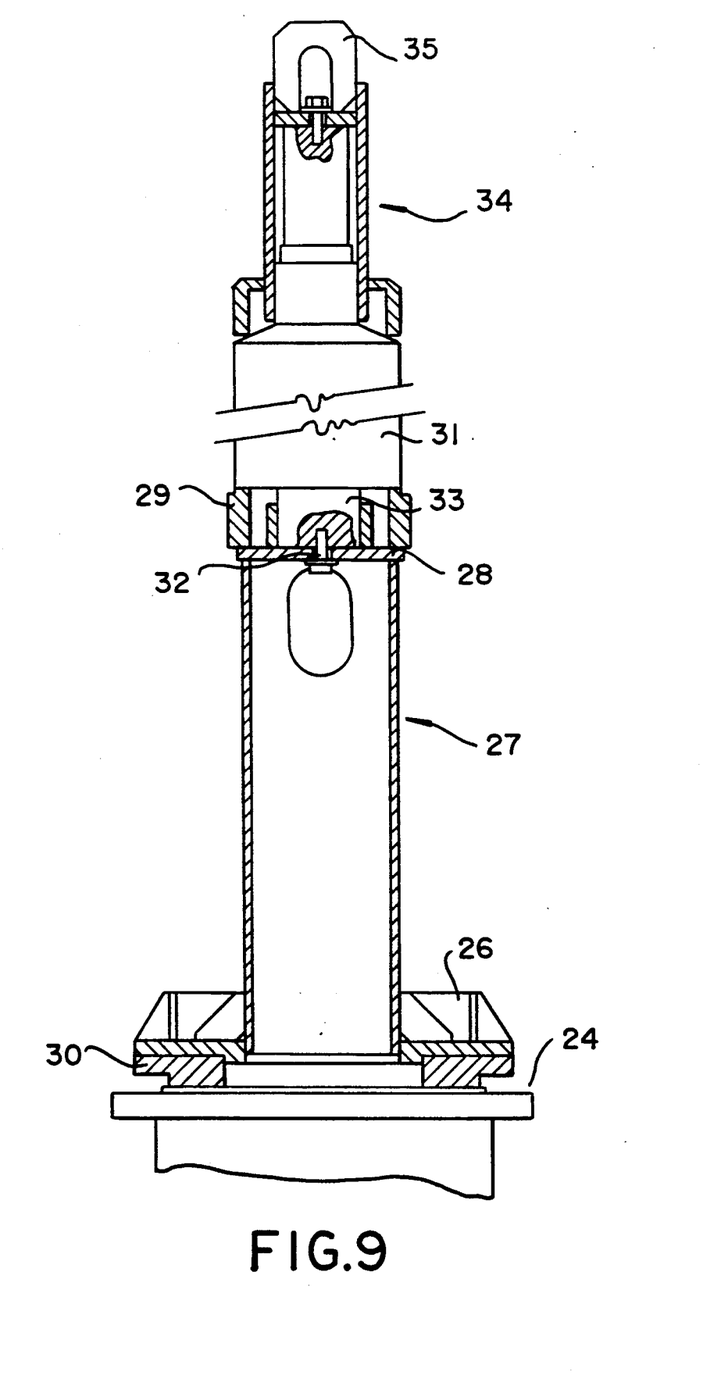
FIG. 9 is a view similar to FIG. 8 of a product holder and adapter for use with the apparatus of FIG. 1.

As may be seen by reference to FIG. 9, a product adapter comprising a base flange 26, a tubular stem 27, a top plate 28 and plug 29 in the form of a collar, may be secured (by way of a spacer 30) and flange bolts (not shown) to one end of the product holder 24. A worn mill roll 31 may be secured to the adapter by a set screw 32 extending into one end of a stub axle 33 of the roll so that plug collar 29 is in effect a co-axial extension of the main body of the roll 31. The plug collar 29 has an outer diameter equal to that required for the reclaimed roll and is a neat fit within the lower bore of the mould 7. The plug collar 29 serves to plug the mould at the start of the cladding operation.

The opposite stub axle of the roll 31 has a protective shroud 34, with a lifting eye 35, applied to it, whereby the roll 31 may be emplaced at the start and removed at the end of the operation.

When, for example at the start of a reclaiming operation, the carriage 14 is lifting a core body, the nuts 22 impose downward loads on the jack screws 19. However, as reclamation proceeds it is necessary for the carriage 14 to pull the cast product, that is in this instance the newly clad core body, downwardly to extract it from the mould 7 and the direction of the load on the screws 19 is reversed.

The long and slender jack screws 19 are ill adapted to sustain compression loadings, and to ensure that the stresses are transferred as tension loads to the respective parts of the jack screws 19 above and below the carriage 14 as the direction of the load changes, limited axial play of the screws relative to the turn-table 8 and base 13 is deliberately provided to ensure all of the axial load on each screw is resisted by the bearing at the end in the direction from which the load is applied, with the part of the screw between that bearing and the nut in tension and the remainder of the screw free of stress.

Thus, each of the bearing assemblies 20 and 21 (see FIG. 7) comprises a fixed outer housing 36 and a floating inner housing 37. The inner housings 37 each have a central bore accommodating tapered roller bearings 38 adapted to resist both radial loads and axial thrust from the screw 19. The bearings 38 are conventional. They are prevented from coming off the ends of the screws 19 by conventional abutment nuts 39 on the screw shaft.

Figure 7:
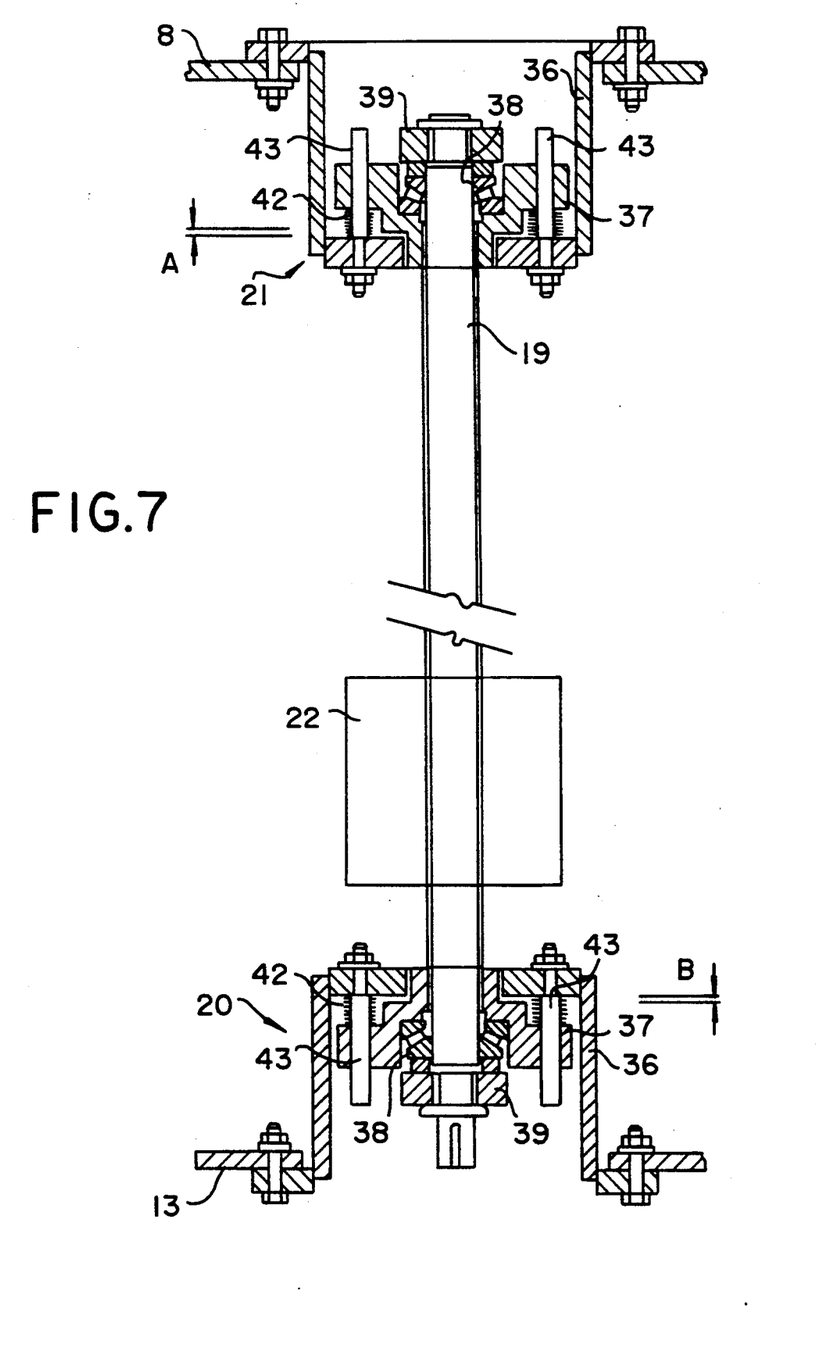
FIG. 7 is a longitudinal sectional view of a jack screw and its bearing arrangements, being components of FIG. 1 drawn to a larger scale.

Each inner housing 37 comprises a spigot slidable within a clearance way in a relatively thick floor of the cup-shaped outer housing 36.

As illustrated in FIG. 7, the inner housings 37 and screw 19 are shown in a central or neutral position with clearances A and B between the inner housings 37 and the floors of the housings 36, but this is somewhat artificial assuming as it does perfectly counterbalanced axial thrusts on the screw 19. In practice the screw 19 and inner housings 37 adopt a position at one or other end of the possible travel with one clearance taken up and the other equal to the sum of A and B.

In the present embodiment the unsupported length of each screw 19 may be some 6 to 7 meters and the total clearance (A+B) may be about 4 mm. This suffices not only to ensure that loads imposed on the screw 19 by the nut 22 are resisted by only one of the bearings 38 (depending on the direction of the load) but also to ensure that any thermal expansion of the screw likely to occur in operation will not cause it to buckle.

To prevent undesirable slackness between the races and rollers of whichever of bearings 38 is relieved of load at any time, preloading of each bearing is provided by, for example, stacks of Belleville washers 42 sleeved upon studs 43 and compressed between the floor 41 and a circumferential flange on the housing 37 of the bearing in question through which the studs may slide.

Electrode carrier means are provided for the support and feed of electrodes into the bath of the mould 7. Those carrier means (see FIGS. 2 and 3) are in the nature of a slewing derrick comprising a fixed tower structure 36 supporting an upright pivotally mounted mast 37, being a main chord of a vertical truss 38 of which the other main chord is a substantial, channel-sectioned track member 39 along which an electrode support carriage may travel.

The truss may be slewed, by the operation of a rotary actuator 40, to bring the electrode support carriage into an operative position above the mould 7. In the present instance the electrode carrier means may service two sets of under floor components and moulds as indicated by positions B and C in FIG. 3, and may also be slewed to align with electrode pick-up and disposal stations A and D.

Figure 2:
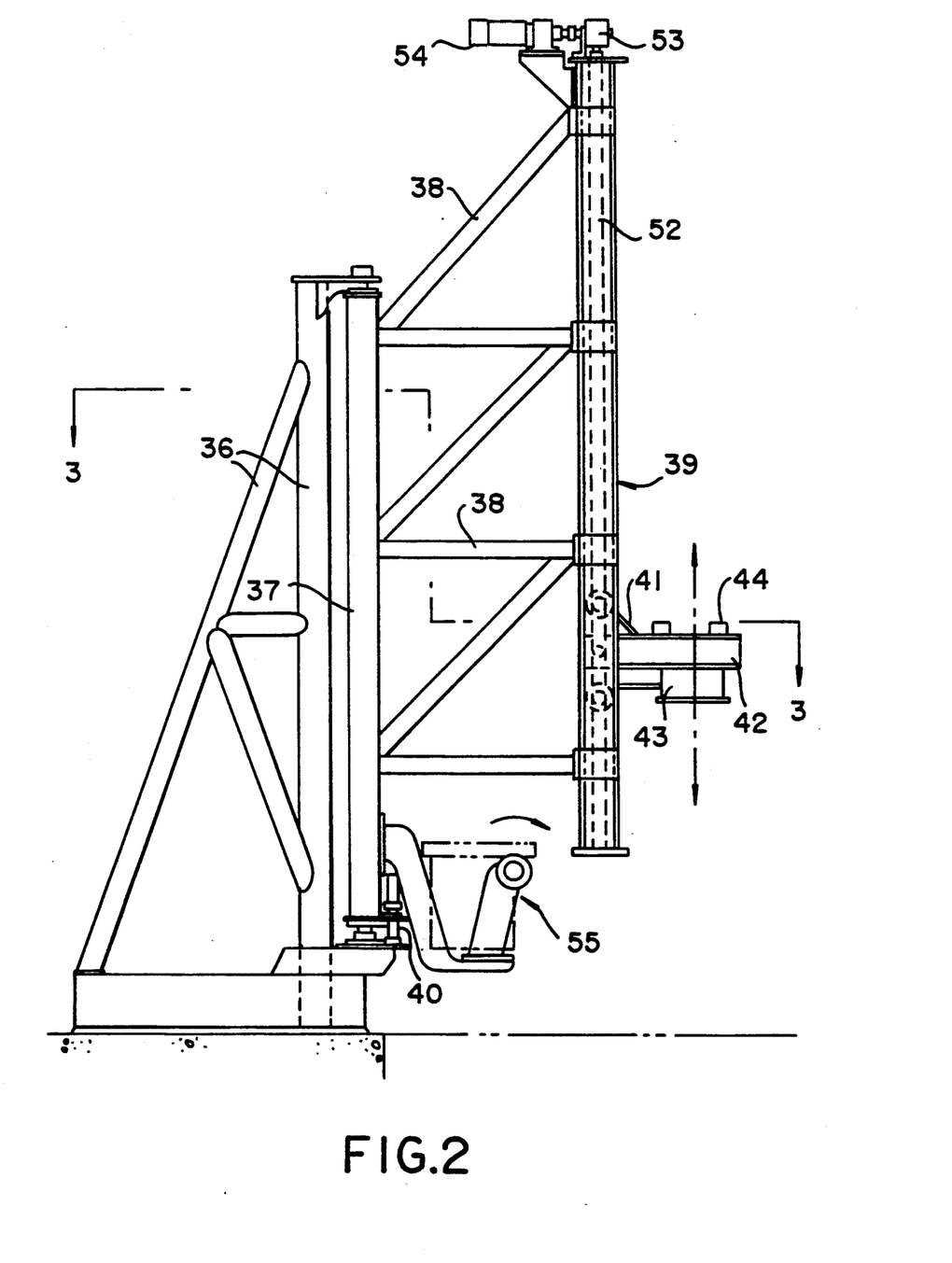
FIG. 2 is a front elevation of the above floor components of the apparatus of FIG. 1.
Figure 3:
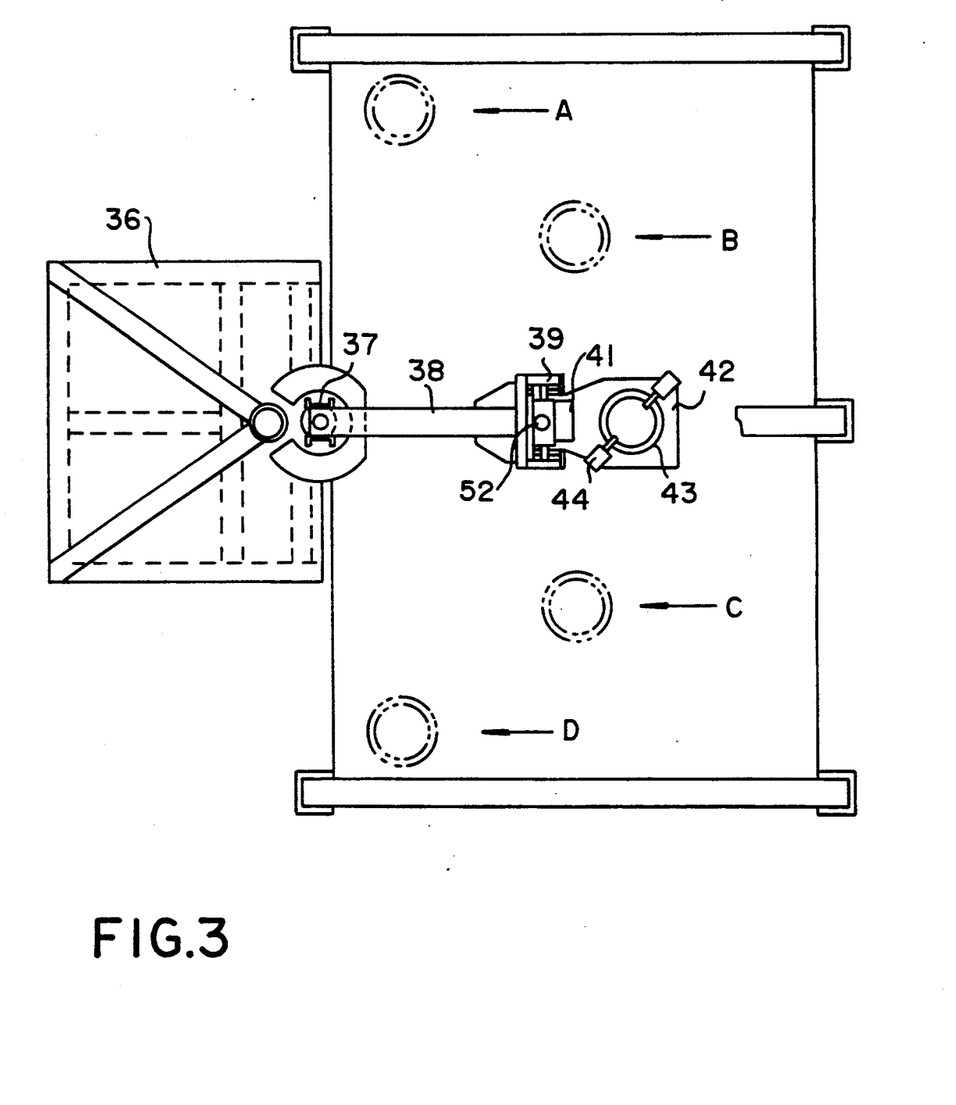
FIG. 3 is a sectional view taken on line 3—3 of FIG. 2.
Figure 4:
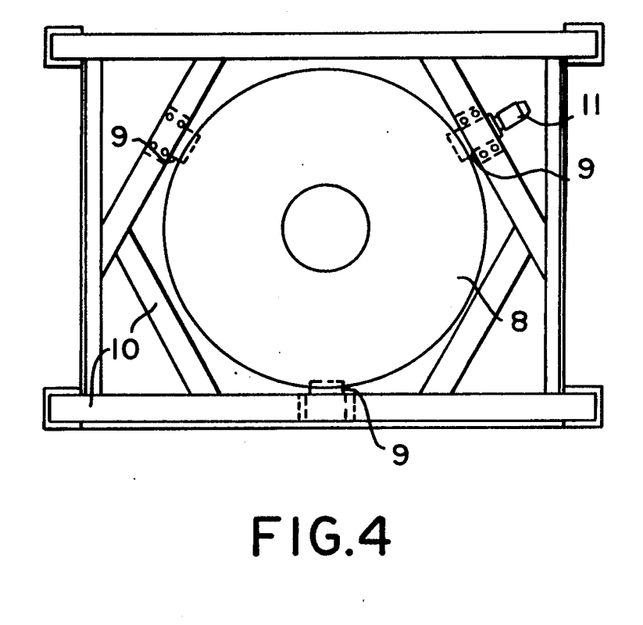
FIG. 4 is a plan view of the subject components of FIG. 1, with a mould removed.
Figure 5:
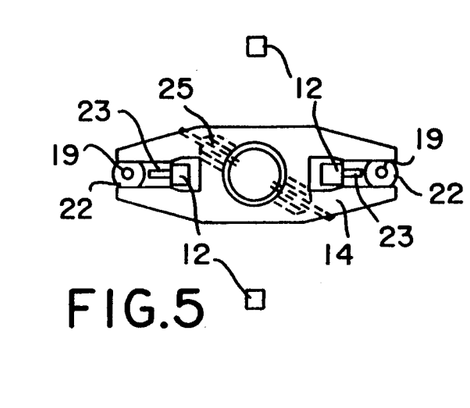
FIG. 5 is a sectional view taken on line 5—5 of FIG. 1.
Figure 6:
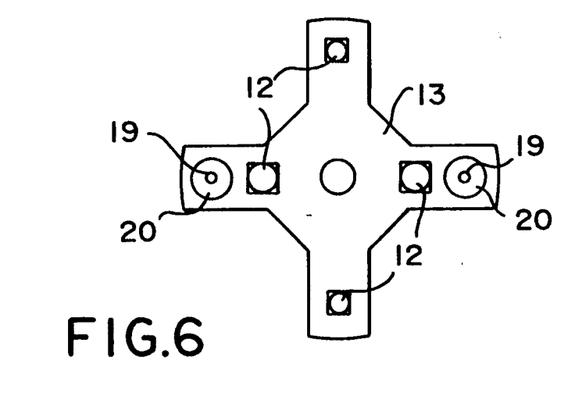
FIG. 6 is a sectional view taken on line 6—6 of FIG. 1.

The said electrode support carriage comprises a bogie 41 with wheels and rollers trapped within the track member 39 and a projecting arm 42 with a tubular electrode holder 43 furnished with hydraulically operated latch bolts 44 for the detachable retention of an electrode adapter 45.

Figure 8:
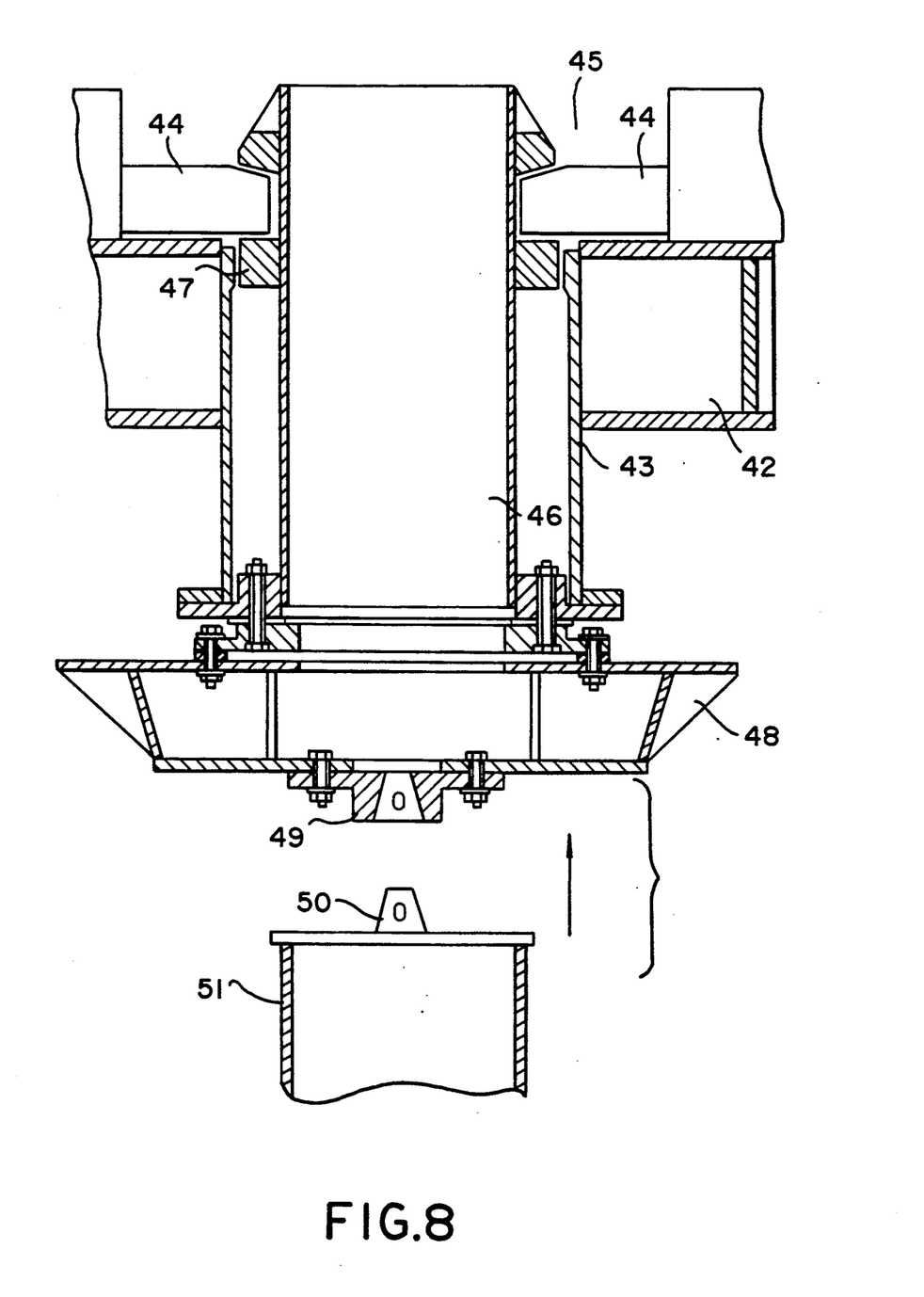
FIG. 8 is a sectional elevation of an electrode holder and adapter for use with the apparatus of FIG. 2, drawn to a larger scale.

The electrode adapter 45 comprises a tubular body 46, locating flanges 47 for engagement by the latch bolts 44, a fabricated base structure 48 bolted to, but insulated from, the body 46 and a tapered socket 49. The socket 49 is adapted to receive a tapered stud 50 projecting from an end plate welded to an end of a split tubular electrode 51. Both the socket 49 and stud 50 have key holes through them and a tapered key driven therethrough serves to hold the mating surfaces of the socket and stud in high pressure contact. In use, terminal flags of water cooled pliable power cables may be bolted to the base structure 48 for the supply of current to the electrode 51.

A tubular electrode or, less preferably, a circular array of rod like electrodes, is required when a core body is being clad, to provide space for the core body in alignment with the centre line of the mould. However if a billet is being cast a single centrally disposed rod or bar shaped electrode may be used. In some instances when a small diameter mill roll is to be reclaimed the old roll may be used as the electrode. Thus the old roll is, in effect, melted down and reformed. In other instances a small diameter roll may be wholly melted even though an additional tubular electrode is utilised.

The electrode support carriage is caused to move along the track member 39 at a controlled rate by means of a jack screw 52 extending for the effective length of the member 39 from a gear box 53 driven by a variable speed motor 54 through a low friction nut on the electrode support carriage, all much as in the corresponding arrangements for the transporter carriage 14.

A conventional, tilting induction heating furnace 55 is provided for initially melting the flux and charging the mould 7.

The truss 38 may also carry a hood (not shown) able to be positioned over the mould 7 as part of an induced draft fume extraction system.

For preference the preheating of the core body includes the step of the induction heating of its skin immediately prior to its entry into the mould 7. This may be achieved by means of an induction heating coil positioned immediately above the mould 7. This enables the degree of preheat of the surface layer of the core body, and thus the degree of melting of that layer and its penetration by the applied coating, to be controlled as the cladding proceeds. If conventional in depth preheating is used it has been found that build up of heat in the core body as it is being clad may sometimes cause excessive penetration and, when a special alloy layer is being applied, undesirable dilution of the cladding alloy with the base metal of the core body, but when preheating by induction heating of the core body skin immediately prior to its entry into the mould is used, the degree of preheat may be readily reduced as needed to avoid those undesirable effects. Such an induction preheating coil may be supported from its own supply transformer at the end of a cantilever fin projecting from the transformer through the longitudinally extending split in the electrode 51 provided for that purpose.

The operation of the above described embodiment may now be readily understood by reference to FIGS. 10 to 15.

Figure 10:
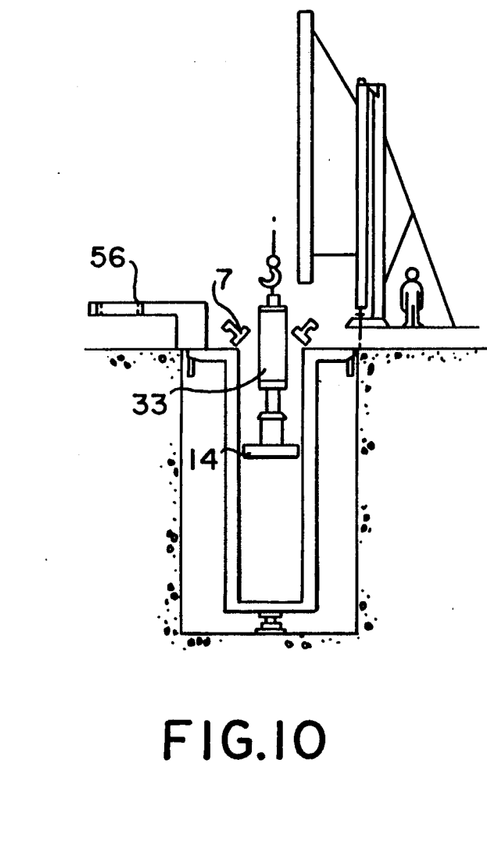
FIGS. 10 to 15 inclusive are diagrammatic representations of the apparatus of FIGS. 1 to 9 showing the several steps in its operation by the method of the invention to clad a core body.

FIG. 10 shows a worn mill roll 33 fitted with adapter and shroud as shown in FIG. 9 being lowered by a crane onto the elevator carriage 14 of a transporter means as detailed in FIG. 1. To enable this to be achieved the two parts of the mould 7 have been separated and an induction heating coil 56 has been swung aside.

Figure 11:
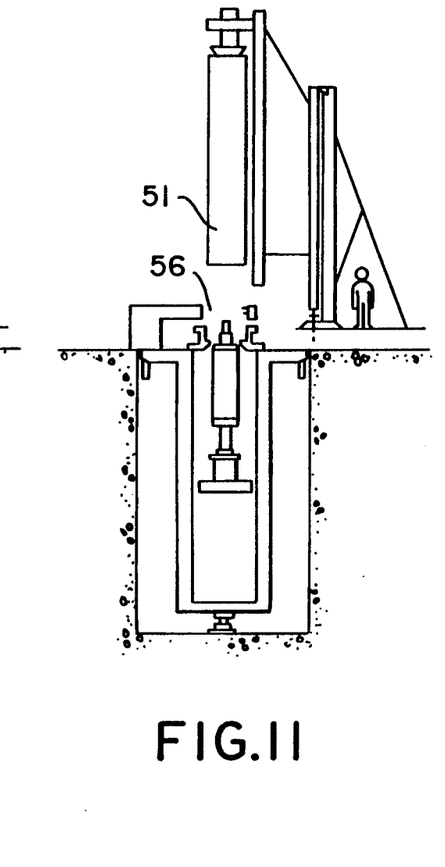

FIG. 11 shows the mould parts brought together, the induction coil in place and the split tubular electrode 51, engaged by electrode transport means according to FIGS. 2, 3 and 8, positioned above the mould.

Figure 12:
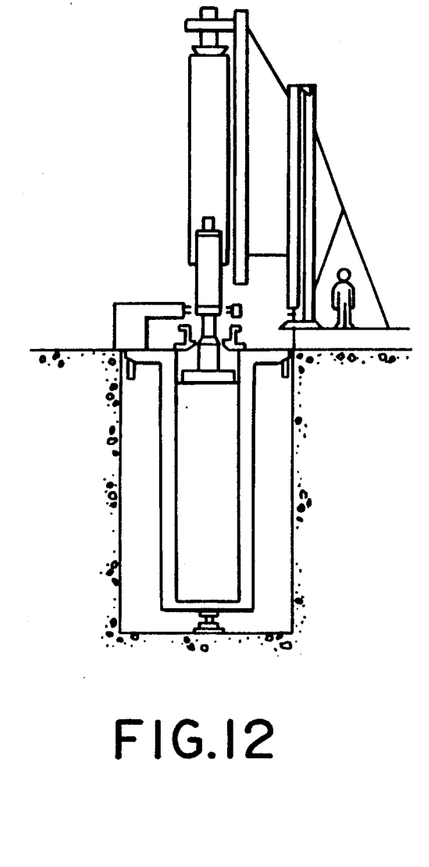

In FIG. 12 the worn roll has been elevated and its preheating commenced.

Figure 13:
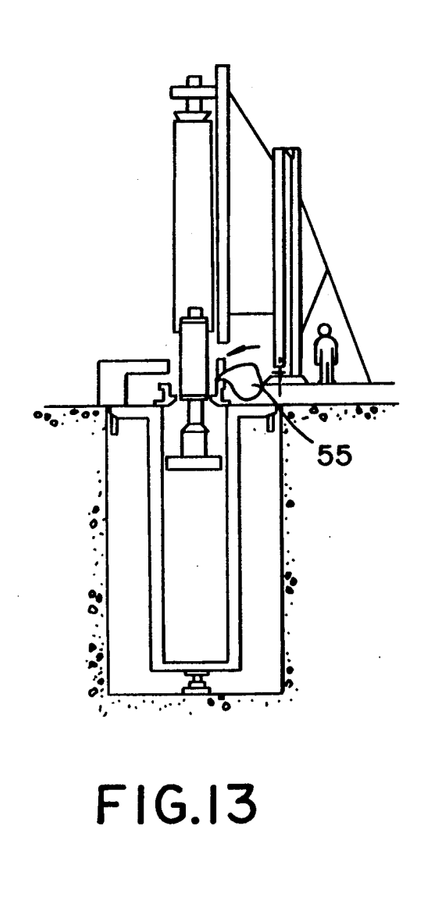

FIG. 13 shows the mould being charged with premelted flux from the tilting furnace 55.

Figure 14:
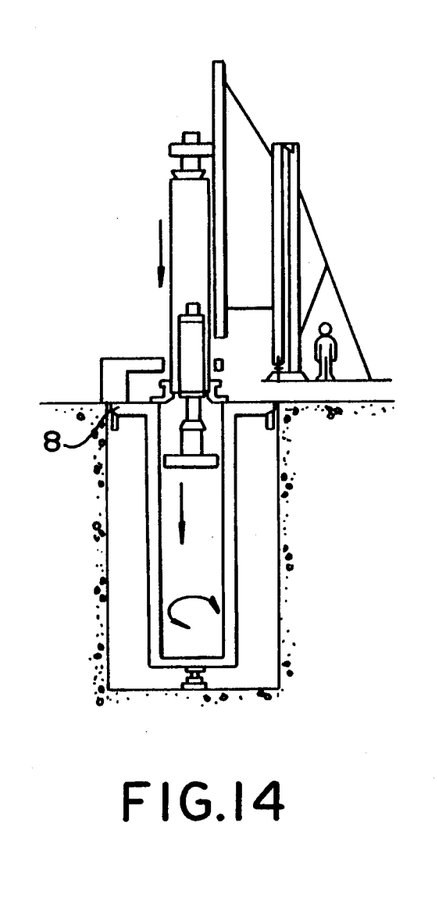

FIG. 14 shows the cladding proceeding. The electrode is being lowered into the flux in the mould, the reclaimed roll is being drawn downwardly and in, accordance with the characterising feature of the invention, the turntable 8 and all the parts, including the reclaimed roll, carried by it, are being rotationally oscillated to and fro.

Figure 15:
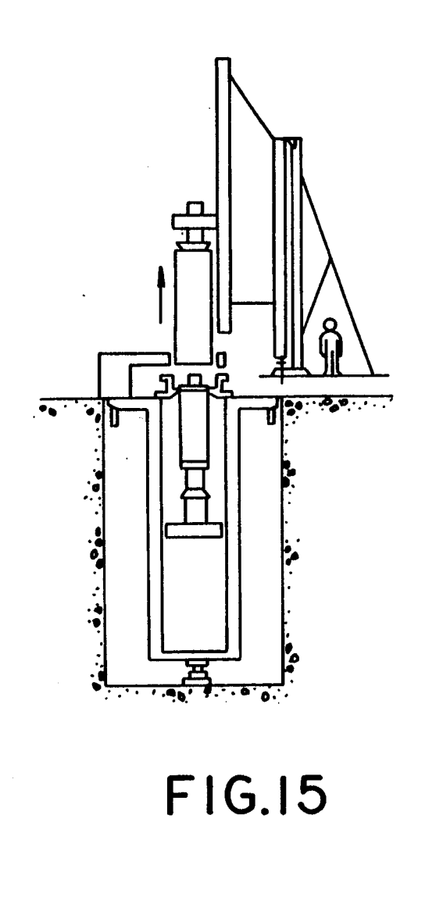

FIG. 15 shows the cladding completed and the remnant of the electrode being lifted away.

I claim:

1. An electro-slag continuous casting apparatus comprising an electro-slag mould comprising a bath adapted to hold a pool of molten flux and an underlying pool of refined liquid metal, and an exit passage extending downwardly from the mould, electrode carrier means adapted to feed a consumable electrode of raw metal into said bath, power supply means to pass a heating current from the electrode through the pool of molten flux to melt the electrode, product transporter means to draw a cast product downwardly from the mould, and drive means for effecting concerted rotary oscillation of the mould, transporter means and product about the axis of the product.

2. Apparatus according to claim 1 further including a turn-table on which the mould is supported and from which the transporter means depend, said drive means acting on the turn-table.

3. Apparatus according to claim 2 wherein the turn-table is supported by three or more rollers and the drive means comprise a reversible motor powering at least one of those rollers.

4. Apparatus according to claim 2 wherein the transporter means comprise a plurality of columnar hangers extending downwardly from the turn-table, a base secured to the lower ends of the hangers, an elevator carriage ridable upwardly and downwardly on at least two of those hangers, at least two jack screws each extending from bearing assemblies on the turn-table and on the base respectively through nuts on the carriage, a reversible motor powering those jack screws for rotation in unison and a product holder on said carriage.

5. Apparatus according to claim 4 wherein the bearing assemblies for each jack screw permit limited movement of the screw in its axial direction.

6. Apparatus according to claim 1 wherein the transporter means comprise a product holder engaging a product adaptor including a mould plug.

7. Apparatus according to claim 1 further including an induction heating coil adapted to encircle a core body when positioned closely above the mould.

8. Apparatus according to claim 1 wherein the electrode carrier means are slewable to enable them to service a plurality of spaced apart moulds and associated transport means.

9. A method of making a cast product comprising the steps of charging an electro-slag mould with molten flux, continuously feeding a consumable electrode of raw metal into the flux, passing an electric current from the electrode through the flux to maintain it molten and progressively melt off the electrode to form a pool of molten metal, and while rotationally oscillating the mould and product in unison about the axis of the product, withdrawing a solidified product through the bottom of the mould.

10. A method according to claim 9 further including moving a core body downwardly through the mould such that the cast product comprises the core body and a cladding layer of electrode metal fused thereon.

11. A method according to claim 10 further including the step of preheating the surface layer of the core body prior to moving the body downwardly through the mould.

12. A method according to claim 11 wherein the step of preheating is effected by means of an induction heating coil.

13. A method according to claim 12 wherein said heating coil is positioned closely above said mould so as to effect preheating of a surface layer of the core body shortly before it enters the pool of molten metal.

* * * * *

UNITED STATES PATENT AND TRADEMARK OFFICE
CERTIFICATE OF CORRECTION

PATENT NO. : 5,146,976
DATED : September 15, 1992
INVENTOR(S) : John D. BRAMBLETT It is certified that error appears in the above-identified patent and that said Letters Patent is hereby corrected as shown below:

On the Title page, item [75],

Please correct the address of the inventor from "DAPTO" to --NEW SOUTH WALES--.

Signed and Sealed this

Nineteenth Day of October, 1993

Attest:

BRUCE LEHMAN

Attesting Officer

Commissioner of Patents and Trademarks